W. J. VINCENT
ROTARY ENGINE.
APPLICATION FILED APR. 7, 1915.

1,196,315.

Patented Aug. 29, 1916.
2 SHEETS—SHEET 1.

Witnesses,

Inventor
William John Vincent
By Abraham Press.
his Attorney

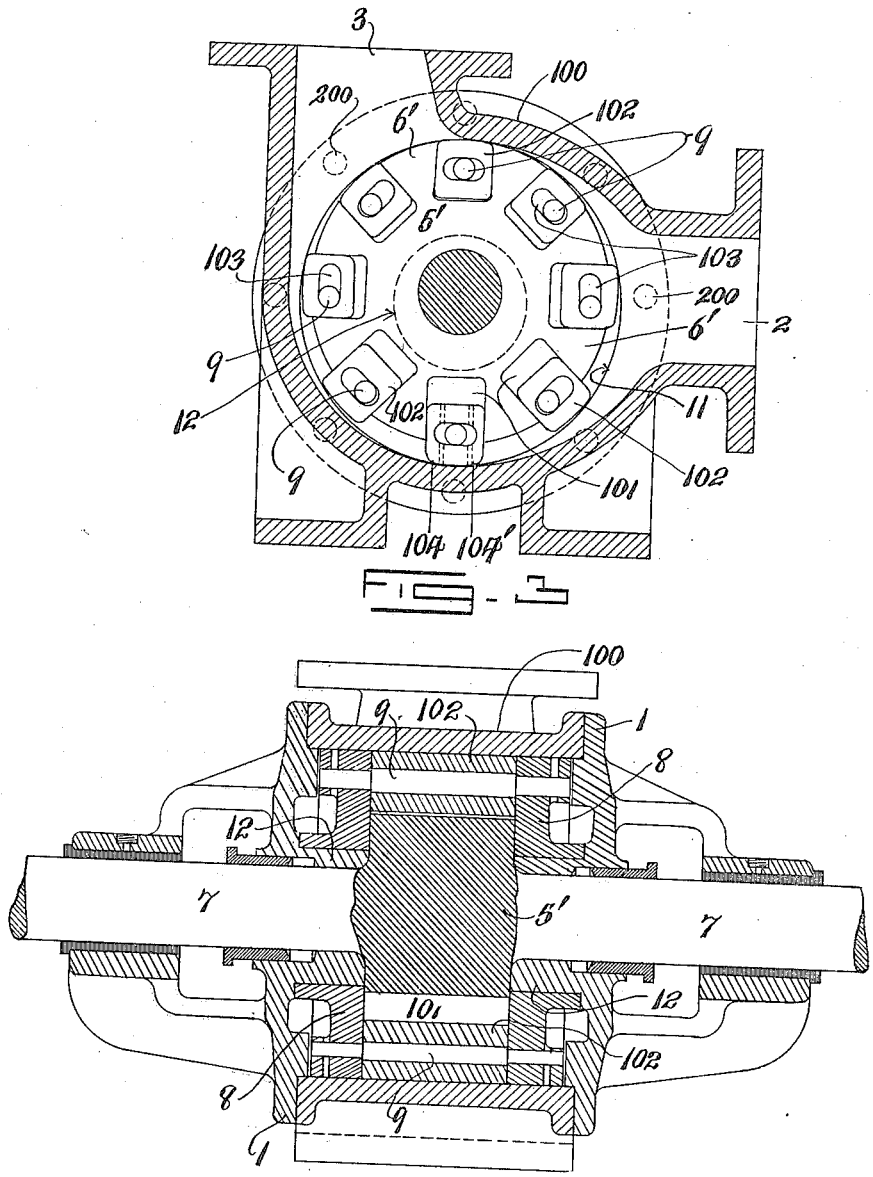

UNITED STATES PATENT OFFICE.

WILLIAM JOHN VINCENT, OF LONDON, ENGLAND.

ROTARY ENGINE.

1,196,315.     Specification of Letters Patent.     Patented Aug. 29, 1916.

Application filed April 7, 1915. Serial No. 19,775.

*To all whom it may concern:*

Be it known that I, WILLIAM JOHN VINCENT, a subject of the King of Great Britain, residing at London, England, have invented certain new and useful Improvements in Rotary Pumps or Engines, of which the following is a specification, reference being had therein to the accompanying drawing.

This invention relates to an improved rotary pump or engine, and has for its object to provide a device for use either as a pump, motor or turbine for use with compressible or incompressible fluid which shall be simple of construction and efficient in use.

In the embodiment of my invention as disclosed in the subjoined description the rotation of a rotor I cause to take place in contact at its periphery with a bridge located somewhere between the inlet and outlet orifices of the apparatus, the rotor aforesaid in its rotation so contacting or coöperating with some member located in eccentric relation to it that at each revolution of the rotor there is a displacement dependent upon the eccentricity between the two members.

Figure 1:
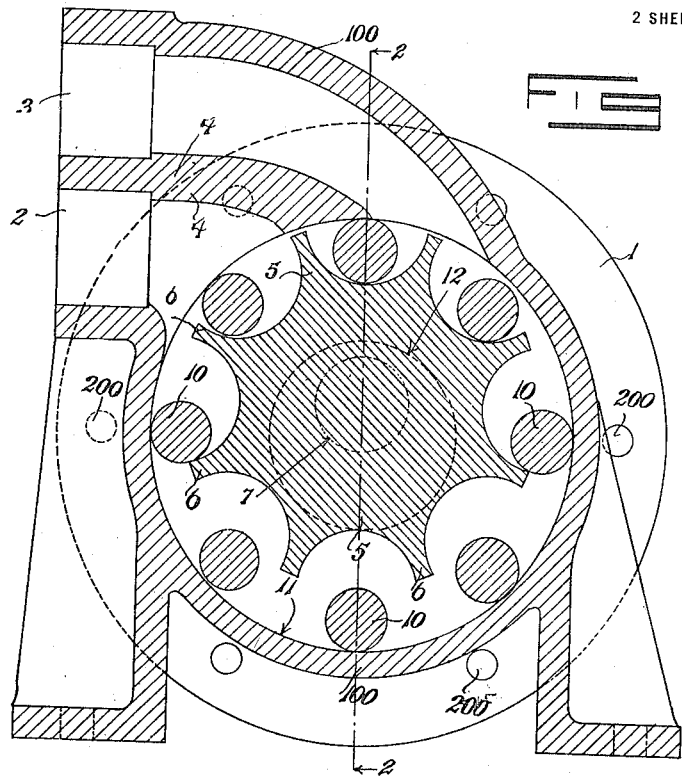
Figure 2:
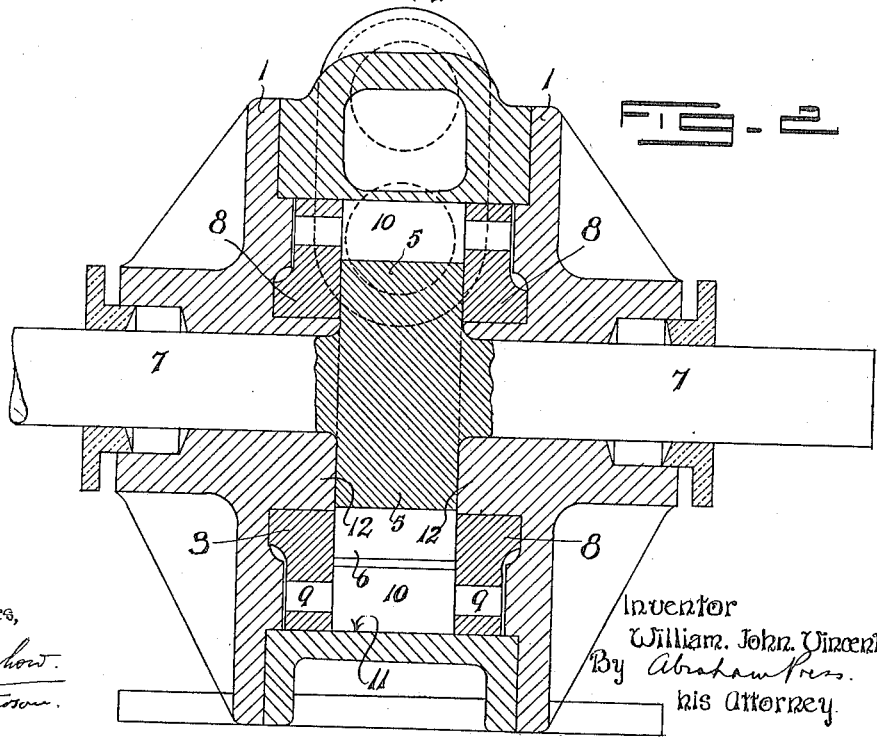

Figure 1 is a vertical section through the pump or engine, and Fig. 2 is a section at right angles to Fig. 1 along the line 2—2. Fig. 3 is a sectional view showing a modification of the squirrel cage rotor disk. Fig. 4 is a section at right angles to Fig. 3.

According to my invention I provide an outer casing 1 having inlet and outlet orifices 2, 3, in a central casing member 100, and I provide a bridge 4 dividing these inlet and outlet orifices. I also provide bolts 200 for assembling the pump structure. Mounted to rotate within this casing I provide as in Figs. 1 and 2 a rotor 5, and this rotor is mounted to rotate eccentrically within the casing and its outer periphery is composed of or formed with ribs or teeth 6 preferably running axially. This rotor is keyed or otherwise in rigid connection with a shaft or spindle 7 through which the rotor is driven, if the device is used as a pump, or through which motion is transmitted if the device is used as a turbine or motor.

Surrounding the rotor proper aforesaid I provide a second rotatable structure 8 which is mounted to rotate eccentrically in relation to the rotor proper aforesaid, and this second rotatable structure is of cage-like form and comprises bars 9 preferably surmounted by rollers 10 located between the ribs aforesaid on the rotor proper and the outer surfaces of these bars rotate in contact with the inner periphery 11 of the stationary outer casing of the apparatus. The bars are connected at their ends to disks 8 mounted to rotate upon an eccentric boss 12 preferably formed upon the side walls of the casing aforesaid. The spaces between the ribs on the rotor proper aforesaid as shown in Figs. 1 and 2 are wider than the bars. In fact the gaps between the ribs on the rotor proper illustrated in Figs. 1 and 2 are approximately twice the difference in eccentricity between the two rotatable members plus the width or thickness of the bars of the second rotatable member. However the modification shown in Figs. 3 and 4 has advantages especially when dealing with fluids having small viscosity.

In operation assuming the device is operated as a pump, the rotor proper 5 is driven in any suitable way and by reason of the eccentricity the ribs 6 on the rotor coöperate at certain points of the revolution with the bars 9 and rollers 10 of the disks 8 of the second rotatable member, and this second rotatable member is driven by the rotor proper, and the arrangement is such that at one, and possibly two points, the suction and delivery sides of the apparatus are divided by the positive engagement of a bar and roller of the second rotatable members 8, 9, 10, with a rib of the rotor proper 5. It will be appreciated that by reason of the eccentricity between the two rotatable members this contact takes place practically continuously at the same point or points of the revolution, and it will also be appreciated that by reason of the eccentricity of the two rotatable members a displacement of the fluid within the casing must take place and by continuous revolution there is a continuous suction and delivery. Of course in principle if the second rotatable member were to be driven by some means, this would in coöperation with the rotor member 5 give the same suction effect. If the device is utilized as a motor or engine with either compressible or incompressible fluid, it is only necessary to supply fluid pressure to the apparatus. The apparatus is reversible, that is to say, the inlet can be utilized as the outlet and vice versa.

The foregoing apparatus is given by way of example only, and does not exhaust the possible forms of apparatus constructed in accordance with my invention.

Instead of providing rollers engaging on curved surfaces in the rotor proper, in Figs. 3 and 4 I provide a rotor proper 5' provided with ribs 6' formed by parallel slots 101 in which move the rectangular blocks 102 provided with slots 103 for the movement of the bars or pins 9 of the squirrel cage rotor 8 surmounted as before on the eccentric boss 12. By this means whereas with rollers 10 one only obtains a line contact with the inner surface 11 of the casing, in the present modification a surface contact 104, 104' is obtained which has especial advantage when dealing with fluids having small body or viscosity. Otherwise the manner of operation is precisely that of Figs. 1 and 2.

What I claim and desire to secure by Letters Patent is:—

1. In combination with a casing having an outlet and an inlet, a squirrel cage rotor within the casing having cylindrical members and an interlocking eccentrically placed rotor within the first named rotor having semi-circular pockets the walls of which form continuously engaging surfaces for the cylindrical bars of the squirrel cage rotor while in interlocking engagement.

2. In combination with a casing having an outlet and an inlet, a squirrel cage rotor within the casing having cylindrical antifriction devices, bosses on the casing walls upon which the rotor is mounted, a second rotor placed within the first named rotor and mounted on a shaft passing eccentrically through the aforesaid bosses, said second rotor having semi-circular pockets in its periphery in which the cylindrical antifriction devices are located.

3. A pump or motor comprising a stationary outer casing, a squirrel cage rotor and a second rotor within it having teeth or ribs between which the bars of the squirrel cage rotor are located wherein the gaps between the teeth or ribs of the eccentrically placed rotor measure approximately twice the distance between the centers of the two rotatable members plus the thickness of the ribs or bars located in said gaps.

4. A pump or motor comprising the combination with a stationary casing having an outlet and an inlet of a squirrel cage rotor within the casing and an interlocking eccentrically placed toothed rotor within the first named rotor, the number of teeth in the toothed rotor corresponding to the number of the bars of the squirrel cage rotor.

In testimony whereof I affix my signature in presence of two witnesses.

WILLIAM JOHN VINCENT.

Witnesses:
A. A. Thornton,
E. A. Eve.